United States Patent [19]
Tang et al.

[11] Patent Number: 5,748,203
[45] Date of Patent: May 5, 1998

[54] COMPUTER SYSTEM ARCHITECTURE THAT INCORPORATES DISPLAY MEMORY INTO SYSTEM MEMORY

[75] Inventors: Tsan-Bih Tang; Chih-Chan Yen, both of Hsinchu, Taiwan

[73] Assignee: United Microelectronics Corporation, Hsinchu, Taiwan

[21] Appl. No.: 610,456

[22] Filed: Mar. 4, 1996

[51] Int. Cl.⁶ .................................................. G06F 13/16
[52] U.S. Cl. .......................... 345/521; 345/512; 345/507; 711/106; 711/147
[58] Field of Search .................................. 395/501, 503, 395/507, 511, 512, 515, 518, 520, 521, 432, 433, 474, 480; 365/189.01, 189.05; 345/501, 503, 507, 511, 512, 515, 518, 520, 521, 432, 433; 711/105, 106, 147, 151

[56] References Cited

U.S. PATENT DOCUMENTS

| | | | |
|---|---|---|---|
| 4,953,101 | 8/1990 | Kelleher et al. | 395/505 |
| 5,335,322 | 8/1994 | Mattison | 395/511 |
| 5,450,542 | 9/1995 | Lehman et al. | 395/512 |

Primary Examiner—Matthew M. Kim
Assistant Examiner—U. Chauhan
Attorney, Agent, or Firm—Cushman Darby & Cushman IP Group of Pillsbury Madison & Sutro LLP

[57] ABSTRACT

A computer architecture that incorporates display memory into system memory is disclosed, which comprises a memory, a memory controller and a display controller. Both of the memory controller and the display controller are employed to control access of the memory device having system data and display data stored therein. Built-in signals and an arbiter are provided between the controllers to arbitrate the priorities of the two controllers to access the memory device. Furthermore, request and grant signals are used to initiate the refresh of the main memory to maintain data therein. The control circuits of the two controllers to the memory device are connected to each other to prevent signals contention.

1 Claim, 4 Drawing Sheets

COMPUTER SYSTEM ARCHITECTURE THAT INCORPORATES DISPLAY MEMORY INTO SYSTEM MEMORY

BACKGROUND OF THE INVENTION

1. Field of the Invention

The present invention relates to computer system architecture. More particularly, the invention relates to a computer architecture incorporating display memory into system memory.

2. Description of Related Art

In most computer systems, a central processing unit processes system data normally stored in a system memory. If data is to be displayed on the monitor, then a display memory must be provided as an output data register in the system. A display controller regularly retrieves data from the display memory to drive the display as it continuously scans.

FIG. 1 (Prior Art) is a block diagram of a portion of the architecture of a conventional computer system. The portion shown relates to memory control. This conventional architecture comprises a central processing unit 20, a main memory 11, a memory controller 13, a buffer circuit 14, a display controller 15, a display memory 17, a master card 25, a monitor 23 and buses 22 and 24. There are essentially two distinct paths for accessing data from the main memory: (1) request of the central processing unit 20 which provides a path from the memory controller 13 or the buffer circuit 14 to the main memory 11 via the bus 22; and (2) request of the master card 25 which provides another path through the memory controller 13 or the buffer circuit 14 to the main memory 11 via the bus 24.

The data access operation for the display memory 17 includes the following paths:

(a) a path for accessing data from the display memory 17 via the bus 24 and the display controller 15 which can connect with main card 25, or connect to the bus 22 and the central processing unit 20 via the memory controller 13 or the buffer circuit 14;

(b) a path for a prefetch operation which is connected to the monitor 23 via the display controller 15 and is provided by the display memory 17; and (c) a path for a refresh operation from the display controller 15 to the display memory 17.

Semiconductor device fabrication techniques have improved dramatically in recent years. Devices now manufactured have a very high density of components per unit area. Accordingly, high capacity memory devices are widely used. It is quite common for personal computers to have from four (4) to sixteen (16) Mbytes of memory. As a result of upgrading central processing units, data buses having a bit length of 64 bits are also quite common in state-of-the-art computer systems. Therefore, there is now sufficient operational capacity to incorporate display memory into the main memory and thereby significantly reduce the hardware of a computer system.

However, efforts to incorporate memory in this manner have not been highly successful. One problem is that there has not been any protocol developed between memory controllers for controlling system data access and display controllers for controlling display data access. Conflicts arise between these two kinds of controllers that cannot negotiate with each other. Secondly, a transient period for switching the two kinds of controllers has to be provided if an additional arbitrating circuit is employed to control externally the operation of the two controllers. The transient period causes time delay and degrades data access efficiency. Moreover, there is required complex logic circuitry if the memory device and the controllers are controlled by external circuits. Further, the control of the memory device becomes unstable due to the time delay caused by the external circuits.

SUMMARY OF THE INVENTION

Accordingly, it is a primary object of the present invention to provide a new computer system architecture that incorporates display memory into system memory that provides greater functionality that known arrangements.

A further object of the invention is provide a new computer system architecture that eliminates the need for a separate display memory by incorporating display memory into system memory and uses internal signals to arbitrate directly without the need for external circuits.

Still another object of the present invention is to provide a computer system architecture incorporating display memory into system memory, which improves the efficiency of data access by controlling the operation of memory devices through the timing relations of fixed signals and reduces the switching operation time delay of controllers.

It is still another object of the present invention to provide a computer system architecture incorporating display memory into system memory, which increases the ability of controlling memory devices by directly connecting control signal lines of the memory controller and display controller.

To achieve the above object, the present invention provides a new computer system architecture that incorporates display memory into system memory. The new architecture includes a memory device, a memory controller and a display controller. A request signal and a grant signal are used to control memory between the display controller and the memory controller. Furthermore, an arbiter can be provided in the memory controller to arbitrate the use of control. The refresh operation of the memory device is controlled by a request signal sent from the display controller.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

Figure 1:
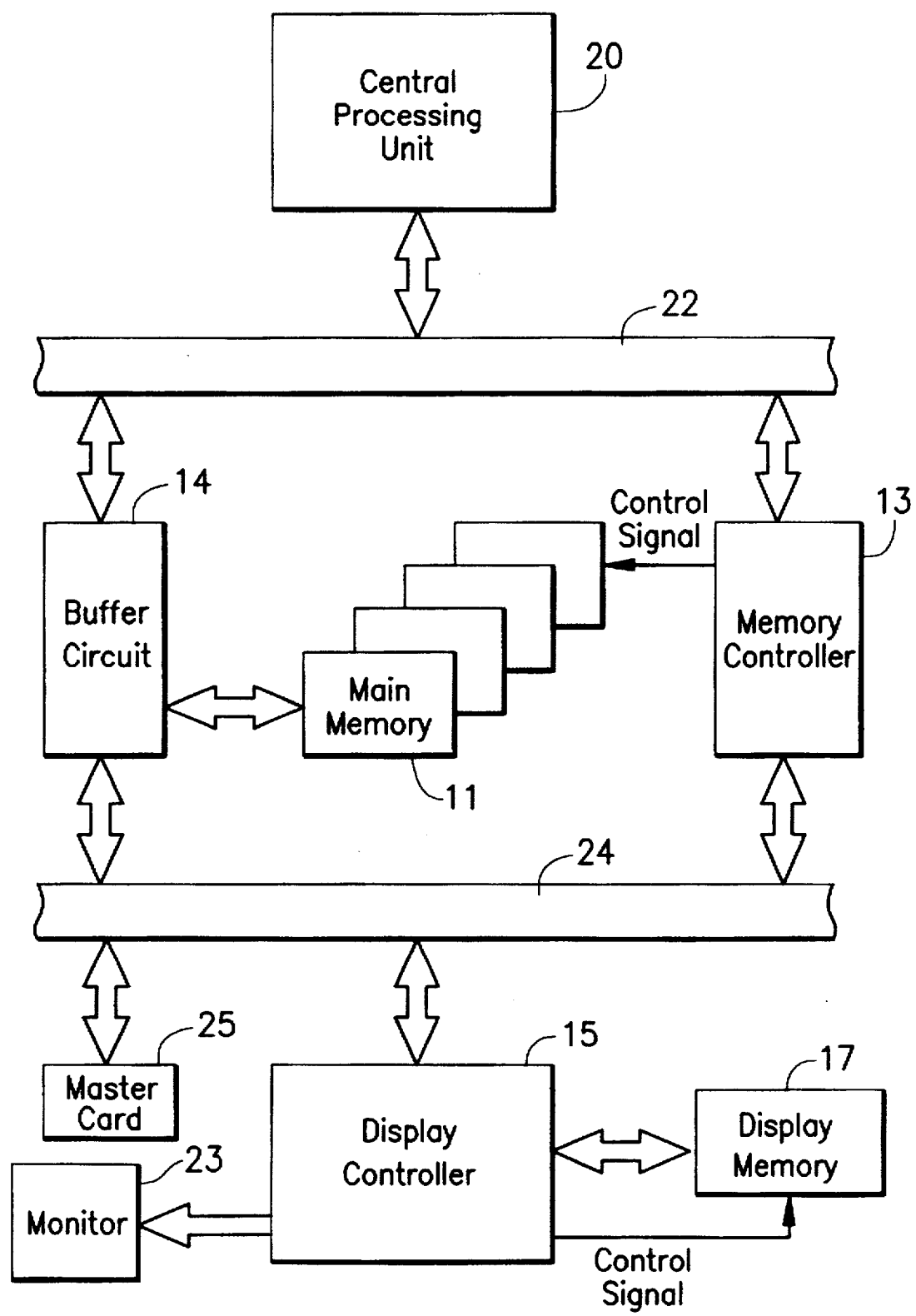
FIG. 1 (Prior Art) is a block diagram of a portion of the architecture of a conventional computer system relating to memory control.
Figure 2:
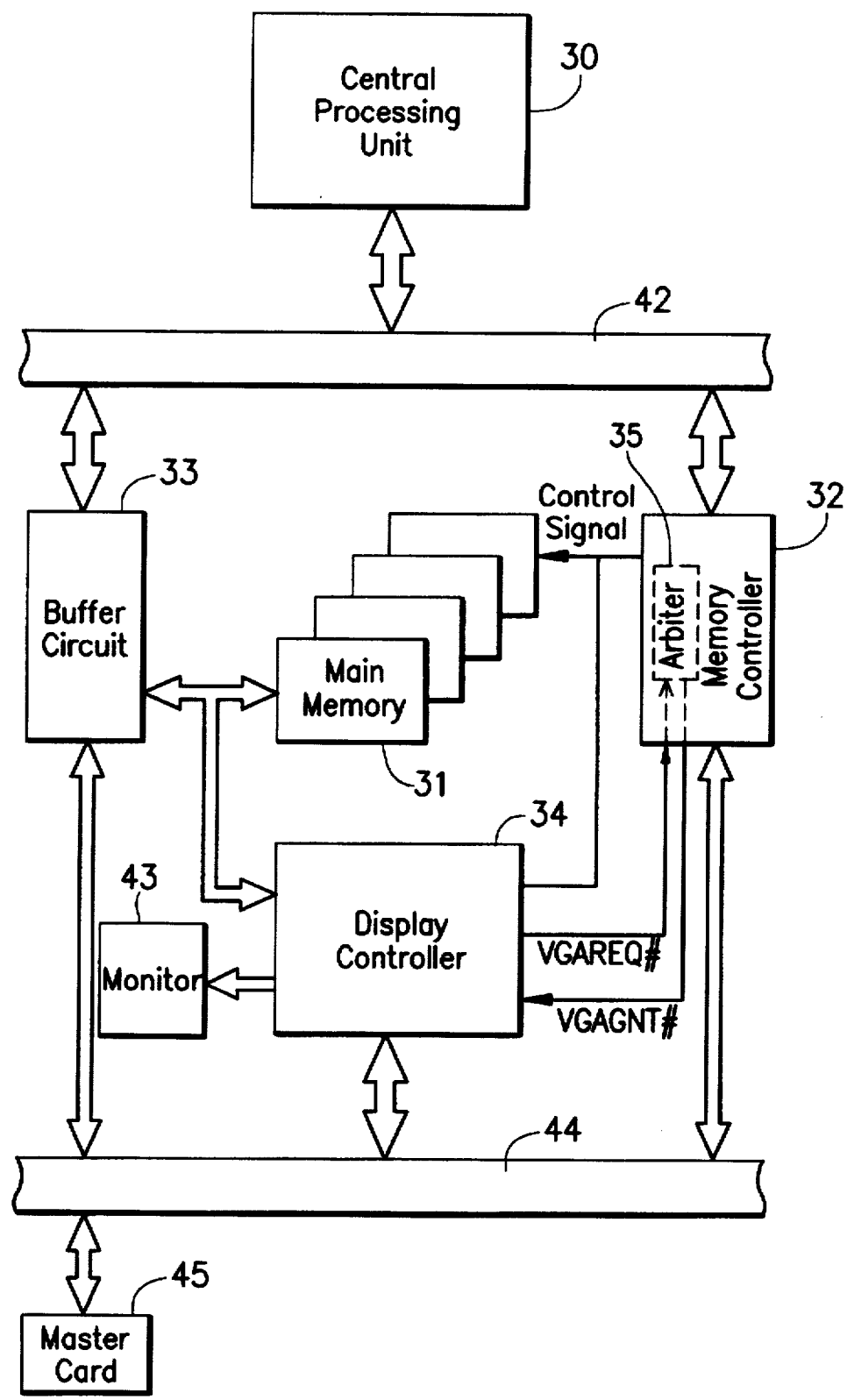
FIG. 2 is a block diagram of a computer system architecture according to the present invention.

FIG. 2 is a block diagram of a computer system architecture according to the present invention. Display memory is incorporated into system memory. System data and display data can both be stored in a single memory device, i.e. the main memory 31. A memory controller 32, connected to the main memory 31 and the buses 42 and 44, controls access to system data. The display controller 34, connected to the main memory 31 and the buses 42 and 44, controls access to display data. The memory controller 32 can also function as a bridge between the buses 42 and 44. In a typical computer system, the bus connected to the central processing unit 30 is a local bus, i.e. the bus 42, and the bus connected to the local bus may be a peripheral component interface (PCI) bus, or a bus of another standard, i.e. the bus 44 of the present invention. Further, the memory controller 32 and the buffer circuit 33 serve as a host bridge between the buses.

Main memory 31 includes a main memory portion and a display memory portion (corresponding to the display memory of a conventional computer system). Access paths for the data in the main memory portion include: (i) a path from the central processing unit 30 to the main memory 31 through the bus 42, via the memory controller 32 or the buffer circuit 33; and (ii) a path from the master card 45 to the main memory 31 through the bus 44, via the memory controller 32 or the buffer circuit 33. Access paths for data being written to and read from the display memory portion include: (i) an access path for display data from the central processing unit 30 to the main memory 31 through the bus 42, the memory controller 32, the buffer circuit 33, the bus 44 and the display controller 34; (ii) an access path for display data from the master card 45, i.e. the peripheral components, to the main memory 31 through the bus 44 and the display controller 34; and (iii) a path of retrieving display data from the main memory 31 directly by the display controller 34, transforming to the screen 43 and then outputting.

Control signals for the main memory 31 generated by the memory controller 32 include access requests for system data of the central processing unit 30 or any of the devices on the bus 44, and refresh for the main memory 31, etc. The control signals for the main memory 31 generated by the display controller 34 include prefetch of display data, access and refresh for the central processing unit and so on. Accordingly, the present invention provides built-in signals to the display controller 34 and the memory controller 32 to arbitrate potentially conflicting controls generated by the two controllers 32 and 34, so that the operation of the main memory 31 is orderly and efficient.

Display controller 34 provides a signal VGAREQ# to memory controller 32 via a first signal line to indicate that the display controller wants to use main memory 31. Memory controller 32 provides a signal VGAGNT#, via a second signal line, to display controller 34 to grant display controller 34 use of the main memory 31.

The processing of the request and grant signals, or other related arbitrating operations can be enhanced by adding an arbiter 35. Arbiter 35 is shown as part of memory controller 32 in this embodiment. However, it could be a separate device. When the display controller 34 needs to access data in the main memory 31, it sends a request signal VGAREQ# to the arbiter 35. Then the arbiter 35 transfers control to the display controller 34 and sends a grant signal VGAGNT# to the display controller 34 at the same time.

Since the memory area accessed by the display controller 34 is set to be non-cacheable and is independent from the memory area of system data access, no compatibility problems arise. The priority can be properly adjusted in response to requirements by using an arbiter to arbitrate the control of the main memory 31.

In most computer systems, the main memory 31 is constituted by dynamic random access memory devices (DRAMs) which store data in capacitive elements that require periodic data refresh to prevent data loss of data due to charge leakage. In the present invention, the refresh of the main memory 31 is initiated by a request signal VGAREQ# from the display controller 34. The request signal VGAREQ# of the display controller 34 is sent out every 16.2 μs which is close to the period, about 15 μs, of a refresh signal generated by a counter (not shown) used in computer systems having conventional architecture. Accordingly, the access for the display controller can be consecutive and will not be interfered with by the refresh operation if the built-in signal VGAREQ# is used to initiate the refresh operation. Thus, the frequency of arbitrating operation decreased and the control latency of the arbiter to the main memory 31 can be reduced to improve the efficiency.

Figure 3:
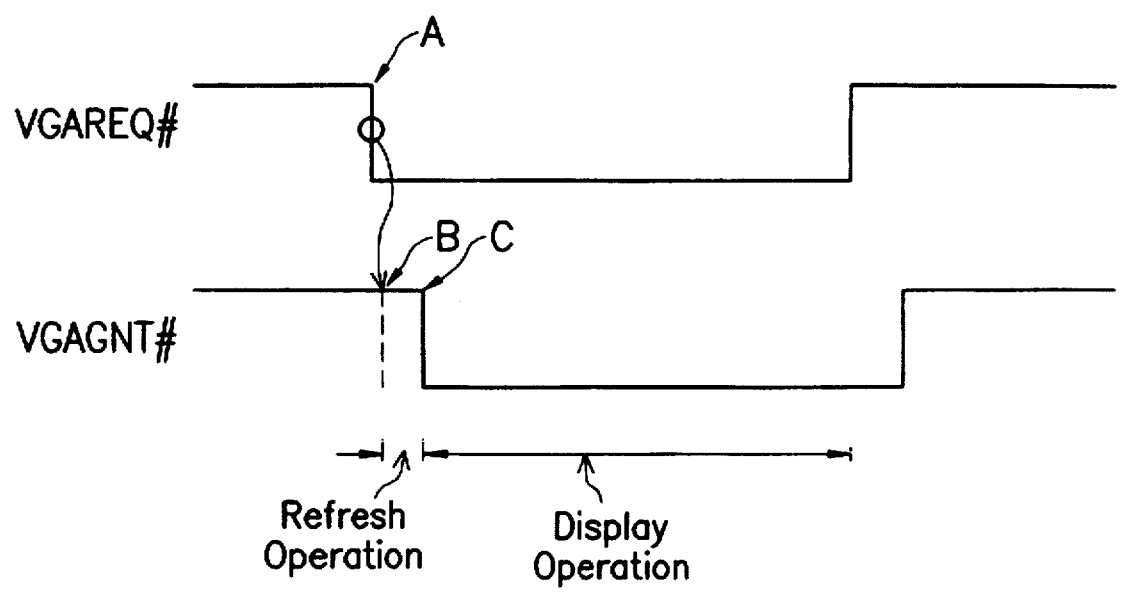
FIGS. 3 and 4 are timing diagrams explaining the memory refresh operation of the computer system architecture according to the present invention.
Figure 4:
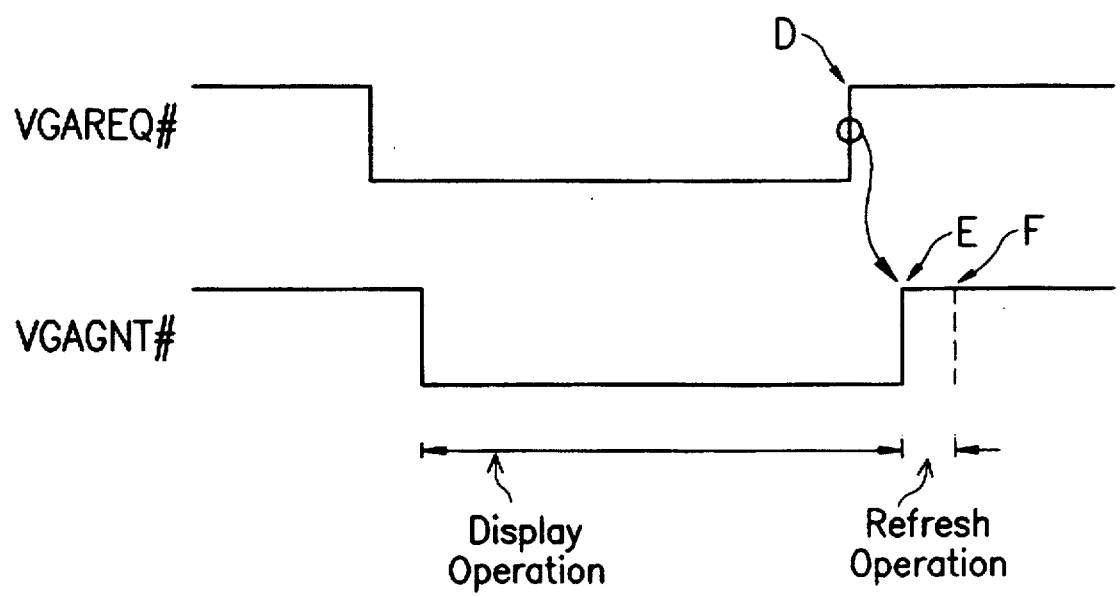

The timing relation between the refresh operation and the request signal VGAREQ# is illustrated in FIGS. 3 and 4. As shown in FIG. 3, the main memory 31 is being refreshed at B while the display controller 34 sends out a request signal VGAREQ# at A and the memory controller 32 has finished its operation cycle. The display controller 34 may prefetch display data at C after the main memory 31 finishes the refresh operation. That is, refresh occurs after the display controller 34 requests access of data and before a grant signal is responded thereto.

Another situation is shown in FIG. 4. The arbiter stops the grant signal VGAGNT# at E after the display controller 34 stops the request signal VGAREQ#, i.e., after the cycle of display data prefetch is ended at D. Thereafter, the refresh operation may proceed until it concludes at F. That is, refresh occurs after the display controller 34 ceases to request data access.

Therefore, initiating the refresh of the main memory 31 by utilizing the request signal VGAREQ# of the display controller 34 as a time base reduces the arbitrating latency. Moreover, for the prior-art architecture having a display memory, it is not necessary to provide an additional refresh signal or timing cycle of the display memory beyond the one-time refresh of the main memory 31. The display controller may thus access data consecutively so as to reduce the timing cycle needed to prefetch display data.

In the computer system architecture according to the present invention, as shown in FIG. 2, the control circuits of the display controller 34 and the memory controller 32 connected to the main memory 31 are interconnected. The two controllers utilize the same control circuitry to control the main memory 31 to prevent signal contention.

Figure 5:
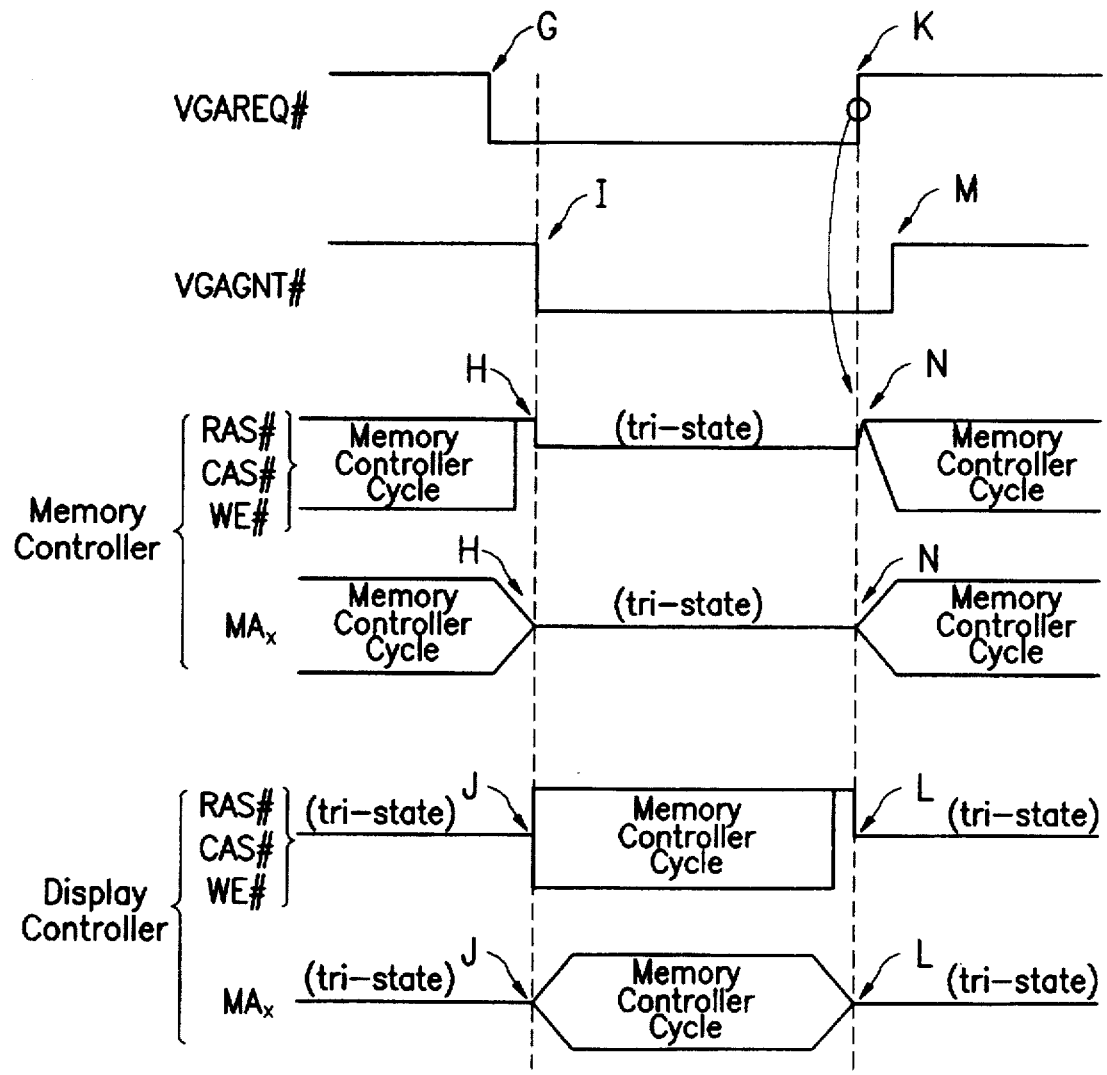
FIG. 5 is another timing diagram explaining the operation of the computer system architecture of the present invention.

FIG. 5 is another timing diagram explaining the operation of the computer system architecture of the present invention. More specifically, this figure explains the timing related to switching of the controllers for use control of the main memory 31. The control signals sent to the main memory 31 include RAS#, CAS#, WE# and MAx. MAx is a memory input address the magnitude of which depends on the size of the memory. Therefore, while the display controller 34 accesses display data from the main memory 31, it pulls down the request signal VGAREQ# at G. The request signal VGAREQ# is sent to the arbiter which will terminate the control cycle of the memory controller 32 over the main memory 31 after its operation cycle is finished. Then the control signals are put in a tri-state status at H. Meanwhile, a grant signal VGAGNT# is sent to the display controller 34 at I to allow the control signals of the display controller 34 change to normal status from tri-state status at J, that is, to hold the main memory in a display controller cycle.

After accessing display data, the display controller 34 will raise the level of its request signal VGAREQ# to indicate a terminate request at K. The control signals RAS#, CAS# and WE# of the memory controller are then driven to a high level at N to hold the main memory 31 in memory controller cycle. Thereafter, the display controller cycle ends and all of the control signals of the display controller 34 are changed to tri-state status at L. The grant signal VGAGNT# is then raised to high level at M. Thereafter, the main memory 31 can be operated in memory controller cycle.

By using the computer system architecture of the present invention, hardware requirements are reduced by eliminating display memory.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A computer architecture incorporating display memory into system memory, comprising:

a memory for storing both system data and display data;

a memory controller, connected to the memory, for controlling access of the system data; and a display controller, connected to the memory, for controlling access of the display data, wherein the display controller includes means for providing to the memory controller a request signal requesting use of the memory, and the memory controller includes means for providing to the display controller a grant signal granting use of the memory to the display controller for arbitrating control of the memory by the display controller and the memory controller;

means for refreshing the memory, the refreshing means including means for generating a request signal by the display controller for causing a refresh operation; and including means for carrying out a refresh operation after a data access request from the display controller and before a grant is received by the display controller.

\* \* \* \* \*